United States Patent

Frost

[15] 3,699,447

[45] Oct. 17, 1972

[54] WIDEBAND FREQUENCY MODULATION COMMUNICATIONS SYSTEM

[72] Inventor: William Thomas Frost, Los Gatos, Calif.

[73] Assignee: International Business Machines Corporation, Armonk, N.Y.

[22] Filed: Jan. 5, 1971

[21] Appl. No.: 104,039

[52] U.S. Cl.......................325/45, 325/38 A, 325/50, 325/136, 325/145, 325/331, 325/345, 325/431

[51] Int. Cl...............................................H04b 1/00

[58] Field of Search..........325/30, 38 A, 45, 50, 136, 325/137, 145, 330, 331, 344, 345, 431, 432

[56] References Cited

UNITED STATES PATENTS

| | | | |
|---|---|---|---|
| 3,466,392 | 9/1969 | Calfee et al. | 325/136 |
| 2,808,504 | 10/1957 | Neumann et al. | 325/50 |
| 3,375,444 | 3/1968 | Lomer | 325/136 |
| 3,204,029 | 8/1965 | Groff et al. | 325/136 |
| 3,229,209 | 1/1966 | Critchlow et al. | 325/50 |
| 3,147,437 | 9/1964 | Crafts et al. | 325/50 |
| 3,300,720 | 1/1967 | Kowols | 325/50 |

*Primary Examiner*—Benedict V. Safourek
*Assistant Examiner*—Peter M. Pecori
*Attorney*—Hanifin and Jancin and Thomas A. Briody

[57] ABSTRACT

A duobinary data input having a first signal spectrum in a relatively low frequency range is fed to a mixer and bandpass filter. The mixer and bandpass filter frequency translates the first signal spectrum to obtain a second signal spectrum separated upwardly in frequency range from the first spectrum. The signal of the second spectrum frequency modulates a carrier wave having a frequency that is near to the upper frequency limit of the second spectrum, so that only a single pair of sidebands is produced by each modulating frequency component. The frequency modulated signal is then passed through a limiter, a divider, and a low pass vestigial sideband filter, respectively, so that the frequency modulated carrier is frequency translated to a third signal spectrum which occupies a bandwidth approximating the bandwidth of the first band of frequencies. This frequency translated FM carrier wave contains a constant carrier wave component and lower frequency sidebands, arranged compactly in a relatively narrow bandwidth. The output of the low pass vestigial sideband filter may be recorded on a recording medium or transmitted in a band limited channel, so that a carrier usable for clocking the duobinary encoded data is continuously present.

8 Claims, 4 Drawing Figures

INVENTOR.
WILLIAM T. FROST

BY Thomas A. Briody
ATTORNEY

WIDEBAND FREQUENCY MODULATION COMMUNICATIONS SYSTEM

BACKGROUND OF THE INVENTION

1. Field of the Invention

This invention relates to a novel and improved communications system for transmitting and receiving duobinary encoded data.

2. Description of the Prior Art

In recent years, considerable efforts have been devoted toward wideband frequency modulation techniques and their consequent applications. For example, an increasing number of different kinds of information, such as printed documents, binary-encoded data, still photographs, motion pictures, and other forms heretofore too diverse for the usual communication handling techniques, can now be converted and combined within a system for storage, display, and output in other forms. These new possibilities introduce new and various bandwidth requirements.

Many data transmission systems currently available use a binary method of operation. However, it has been found that these systems have restricted speed capabilities, and are limited in the number of information bits they can transmit in a specified period. This restriction is due to the bandwidth limitation of the associated data communication channel, resulting in an apparent limit in the number of times (per second) one binary state can be switched to another. Two specific techniques have been developed for increasing the transmission rates of data systems over band-limited channels. One of these, the quaternary method, provides a transmission rate that is double that of a binary system. Although it increases the operating speed, this method increases equipment complexity, and as a result has been found to be undesirable. The other technique is known as the duobinary encoding technique. This approach permits the doubling of the number of times per second one binary state can be switched to the other, and therefore allows a given data channel to accommodate twice as many duobinary digits as binary digits.

In the light of the present importance in the communications field of the duobinary encoding technique and wideband frequency modulation, it has been found desirable to provide a novel communications system which achieves an effective marriage of these two techniques.

SUMMARY OF THE INVENTION

An important object of this invention is to provide a novel and improved system for transmitting duobinary encoded data by wide-band frequency modulation.

Another object of this invention is to provide an improved communications system which uses frequency modulation and demodulation for transmitting and receiving duobinary encoded information.

A further object of my invention is to provide a new an improved wideband recording system which has widespread applicability.

Still another object of my invention is to provide an improved communications system for transmitting information on a frequency modulated carrier which contains a constant carrier wave component that is continuously available for clocking purposes.

In carrying out my invention, in one form thereof, I have provided a source of binary data which is fed to AND or an OR gate that also receives a clocking input. The output of the gate is connected to a flip flop and a low pass filter, respectively, for the purposes of providing a duobinary signal output. This duobinary signal output serves as an input for a mixer and bandpass filter, which also receives a continuous mixing frequency. The mixer and filter frequency translates and filters a first signal spectrum containing the duobinary information, to obtain a second signal spectrum separated from and located upwardly in frequency range from the first signal spectrum. The output of the mixer and bandpass filter is fed to a frequency modulator, where it is modulated with a continuous master oscillator frequency near the upper limit of the second signal spectrum, to obtain a third signal spectrum representative of a single pair of sidebands, together with a constant reference frequency, the carrier. The output of the frequency modulator is then limited, divided and filtered to obtain a signal that includes a constant carrier wave component, together with lower frequency sidebands, and occupies a bandwidth approximating the bandwidth of the first signal spectrum. The filtered output may be fed to a transmission channel or to a recorder.

BRIEF DESCRIPTION OF DRAWINGS

The foregoing and other objects, features and advantages of this invention, will be apparent from the following description of the drawings in which.

DESCRIPTION OF THE PREFERRED EMBODIMENT OF THE INVENTION

Figure 1:
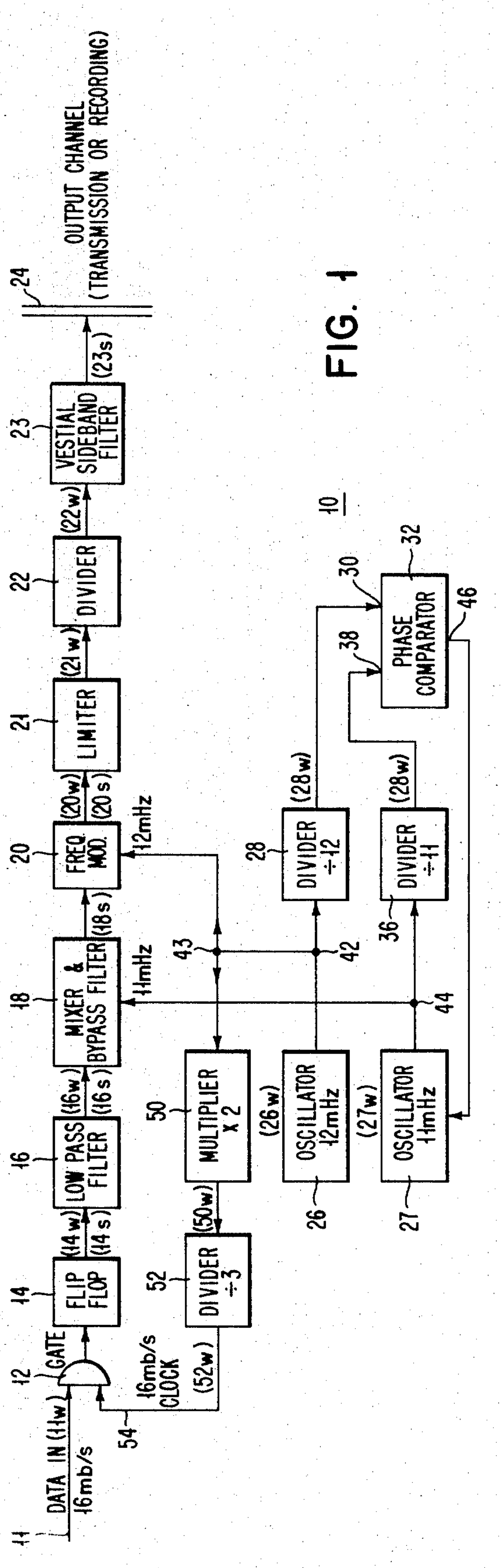
FIG. 1 is a block diagram of a duobinary information transmission system according to one form of my invention.

Referring now to FIG. 1, there is shown a block diagram of a transmission circuit 10 for sending clocked duobinary coded information to an output transmission channel by bestigial sideband and wideband frequency modulation techniques. Duobinary encoded data is three-level encoded data which requires a clock for regaining the original data, and it also requires a low frequency channel response down to D.C.

The overall transmission circuit includes the series combination of data input 11, gate 12, flip flop 14, low pass filter 16, mixer and bandpass filter 18, frequency modulator 20, amplitude limiter 21, a divider 22, and a vestigial sideband filter 23, the output of which is coupled to a suitable transmission or recording channel 24.

To provide a means for furnishing two different phase locked reference frequencies to the mixer 18 and frequency modulator 20 of the transmission circuit 10, the oscillators 26 and 27 are included. Master oscillator 26, which furnishes a center reference frequency to frequency modulator 20, is connected via divider 28 to an input 30 of phase comparator 32; and slave oscillator 27, which furnishes a mixing or heterodyning frequency to the mixer and bandpass filter 18, is connected via divider 36 to an input 38 of phase comparator 32. Point 42, located between the master oscillator 26 and divider 28, is connected to frequency modulator 20, through intermediate point 43; and point 44, located between the slave oscillator 27 and divider 36, is connected to the mixer and bandpass filter 18. The output 46 of phase comparator 32 is connected back to the slave oscillator 27, to provide a feedback path for locking the phases of the two reference frequencies together.

For providing a source of clocking pulses in circuit 10, the reference frequency from master oscillator 26 is fed from point 42 back to the input of gate 12, through intermediate point 43, multiplier 50 and divider 52.

Turning now to a further discussion of the characteristics and operation of the transmission circuit shown in FIG. 1, it will be noted that gate 12 is an AND or an OR gate, having as its data input 11 a binary data stream at a maximum rate of 16 megabits per second (mb/s), and a clocking pulse input 54 at the same rate of megabits per second.

Figure 3:
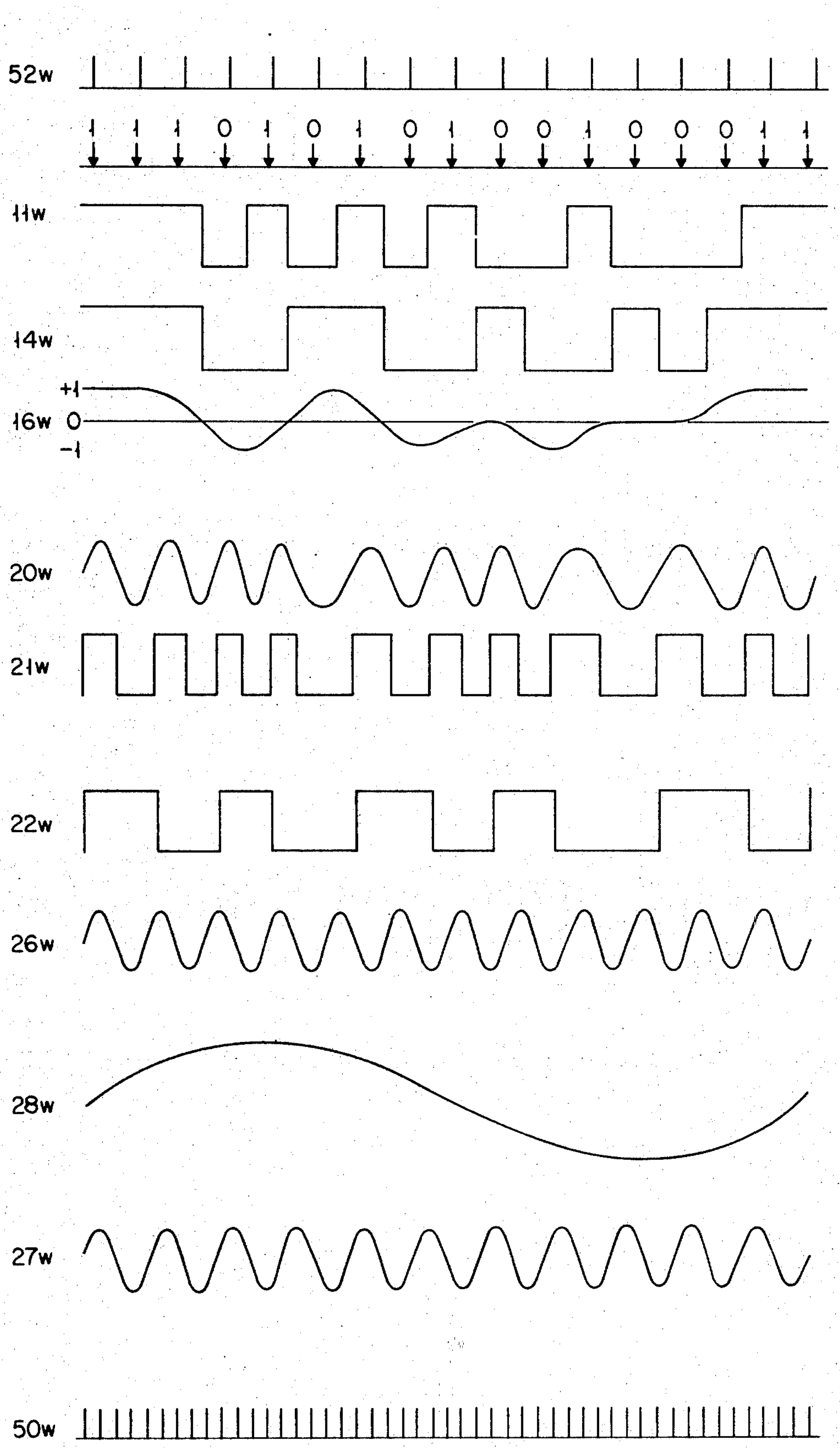
FIG. 3 is a set of waveform diagrams depicting the signals at various referenced component outputs for the block diagrams of FIGS. 1 and 2.
Figure 4:
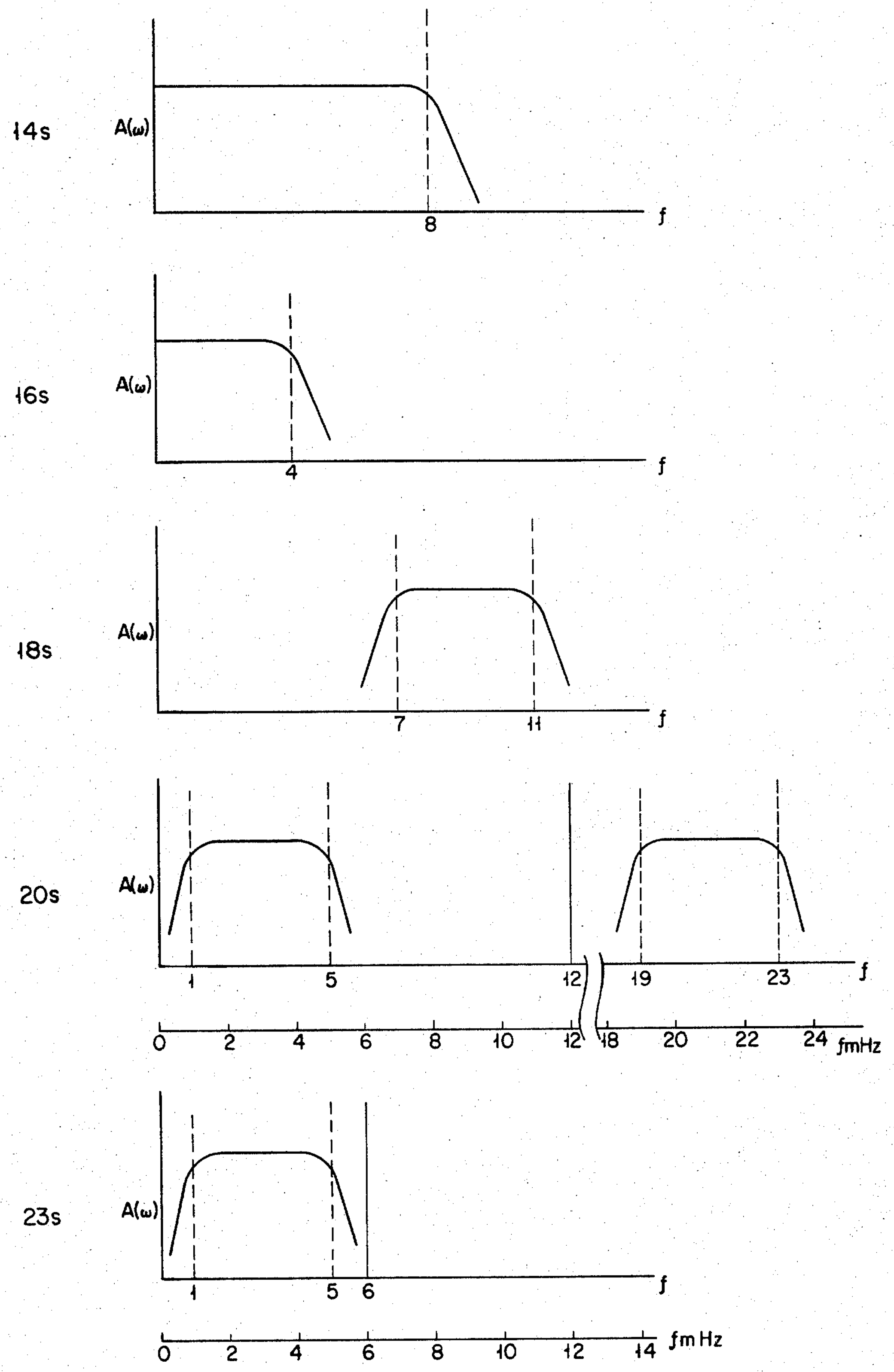
FIG. 4 is a set of signal spectra diagrams for various specific referenced component outputs of the block diagrams shown in FIGS. 1 and 2.

The waveforms at the outputs of certain operationally significant components of transmission circuit 10, are indicated in FIG. 3 by the reference numeral for the component followed by the lower case letter *w*. For example, the waveform which appears at the output of the flip flop 14 is represented in FIG. 3 as waveform 14*w*. In addition, the signal frequency spectra at the outputs of certain operationally significant components, are represented in FIG. 4 by the reference numeral for the component followed by the lower case letter *s*. For example, the signal frequency spectrum curve at the output of the flip flop 14 is represented in FIG. 4 as curve 14*s*.

For converting the 16 megabits per second clocked data bit stream at the input of gate 12 to a duobinary wave, the output of the gate 12 is connected to the flip flop 14 to provide a recoded bit stream having a waveform shown as 14*w* in FIG. 3. It will also be seen that the recoded bit stream at the output of the flip flop 14, has a frequency spectrum as shown by 14*s* in FIG. 4, with a bandwidth of about 0–8 mHz. The output of the flip flop 14 is then fed into the low pass filter 16, which is selected to provide a three level waveform 16*w* (FIG. 3) having a frequency bandwidth of 0–4 mHz, and a frequency spectrum 16*s* (FIG. 4). This is the duobinary coded signal which is to be transmitted and received in accordance with the present invention.

The duobinary coded signal, having the low bandwidth of 0–4 mHz, provides a first input for the mixer and band pass filter 18. A second input for the mixer and band pass filter 18 is provided by means of the slave oscillator 27, which for the invention embodiment of FIG. 1, furnishes a mixing frequency of 11 mHz. This mixing frequency, having a waveform represented by reference 27*w* in FIG. 3, is obtained from the aforementioned phase locked, double oscillator circuit (FIG. 1) which feeds reference signals to both the mixer 18, and the frequency modulator 20.

The waveforms 16*w* and 27*w* (as represented in FIG. 3) are mixed together and filtered by mixer and bandpass filter 18, to produce a frequency translated output having a waveform 18*w* (FIG. 3) and a bandwidth 18*s* (FIG. 4). The bandwidth for the output signal of the mixer and band pass filter 18, is 7–11 mHz. Such a bandwidth is spaced upwardly from the bandwidth of signal spectrum 16*s*, which appears at the output of the low pass filter 16. The output waveform of the mixer and bandpass filter 18 serves as a first input for the frequency modulator 20. As already mentioned, a center reference frequency or carrier wave of 12 mHz, received from master oscillator 26, provides the second input for the frequency modulator 20.

The master oscillator 26 and the slave oscillator 27, are preferably quartz crystal oscillators. Master oscillator 26 provides a constant frequency of 12 mHz, and this frequency is divided by a divisor of 12 in divider 28, the output of which theoretically results in a 1 mHz signal at input 30 of phase comparator 32. Slave oscillator 27 provides a constant frequency source of 11 mHz, and this frequency is divided by a divisor of 11 in divider 36, the output of which theoretically results in a 1 mHz signal at input 38 of phase comparator 32. The two 1 mHz input signals of phase comparator 32 are compared, and a difference signal is developed at the output 46 of the phase comparator 32, which is fed back to the slave oscillator 27 to force it to oscillate at a frequency which will produce a minimum difference signal at the output of the phase comparator 32. The phase detector output signal for the phase comparator 32 will be plus or minus, depending on the direction of the drift between the two oscillators. Thus, the slave oscillator 27 would have its frequency changed until the output of the phase detector is a minimum, approaching zero. Such an arrangement provides an effective technique for furnishing two different phase locked reference frequencies for the transmission circuit 10.

The 7–11 mHz waveform at the input of the frequency modulator 20, frequency modulates the 12 mHz center frequency or carrier fed thereto from the master oscillator 26, to produce a frequency modulated output signal having a waveform 20*w* (FIG. 3). It will also be noted that the signal spectrum 20*s* includes the 12 mHz carrier component.

As is already known in the art, the modulation index $$\beta(\text{beta}) = \frac{\Delta f \text{ (deviation from center frequency of maximum signal amplitude)}}{fm \text{ (highest modulating frequency}}$$

must be less than 0.4 to allow vestigial sideband frequency modulation and to further contain the modulated signal spectrum within a narrow transmission bandwidth with minimal distortion. In the illustrated embodiment, if the 7–11 mHz signal frequency modulates a carrier of 12 mHz, with a deviation of $\pm$ 1 mHz, $\beta$ is always less than 0.4.

The output of the frequency modulator 20 is fed through a limiter 21, to develop a square wave output signal of waveform 21*w* (FIG. 3) that provides the input for divider 22. The divider 22 may comprise a T flip flop (trigger) which responds to its input signal in such a manner that it changes state at each positive going transition to emit an output waveform 22*w* (FIG. 3). This waveform is passed through a vestigial sideband filter 23, to yield a signal having a frequency spectrum 23*s*. The signal 22*w*, having the frequency spectrum 23*s* shown in FIG. 4, has been frequency translated so that it includes a signal bandwidth of 1–5 mHz, and a reference carrier frequency of 6 mHz. It will thus be noted that a relatively small bandwidth or frequency spectrum is provided at the output of the vestigial sideband filter 23 for the frequency modulated duobinary coded information together with a continuously present carrier component.

The wideband frequency modulated and divided output of the transmission circuit 10 may be fed to a suitable transmission channel 24. Alternatively, the output may also, of course, be recorded on a magnetic tape loop of a suitable tape transport unit (not shown).

For effectively providing the clocking input pulses of the transmission circuit 10, the 12 mHz signal sourced by master oscillator 26 is multiplied by a factor of 2, at multiplier 50, and then divided by a divisor of 3, at the divider 52. The output of divider 52 is suitably converted from the resultant 8 mHz signal to obtain a 16 mHz clocking signal at the input 54 of gate 12.

Figure 2:
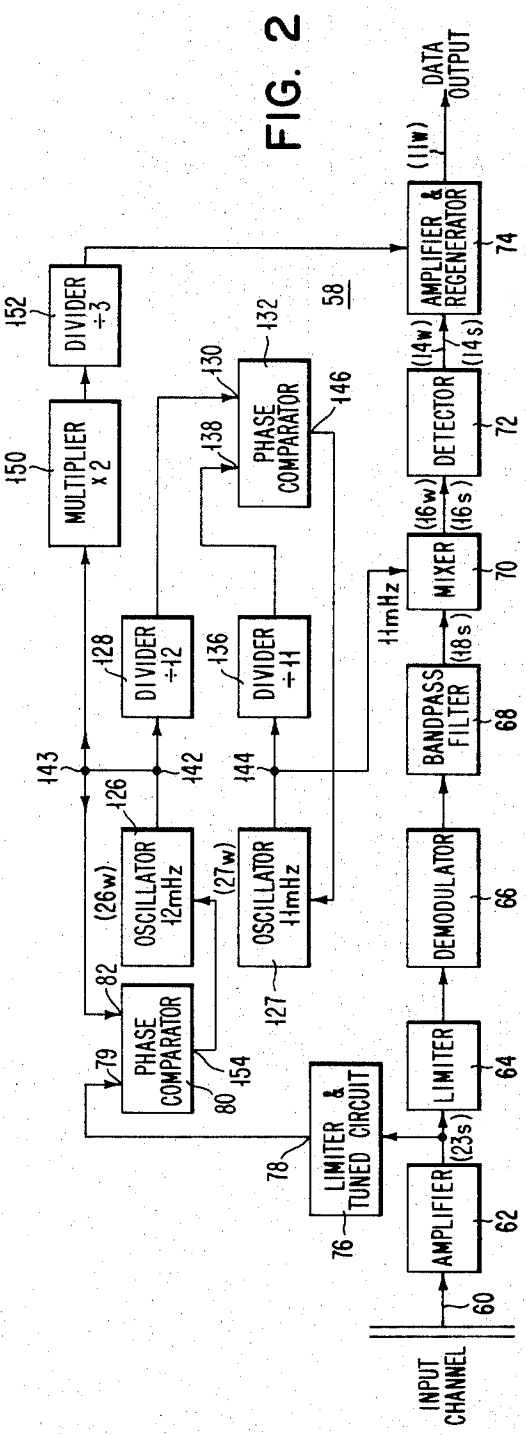
FIG. 2 is a block diagram of a receiver for handling the receipt and data output of duobinary encoded information from the transmitter of FIG. 1.

Turning now to a receiving circuit 58 embodying my invention, attention is directed to FIG. 2. As shown therein by means of block diagrams, it will be noted that the input signal 60 is connected to an amplifier 62, which is respectively in series combination with a symmetrical limiter 64, demodulator 66, bandpass filter 68, mixer 70, detector 72, and an amplifier and regenerator circuit 74.

For obtaining a master reference frequency signal at the receiver 58 in consonance with the transmission channel or tape recording representative of the output of transmission circuit 10, an asymmetrical limiter and tuned circuit 76 (tuned to 12 mHz) is connected to the output of amplifier 62. Output 78 of circuit 76 furnishes one input 79 to a phase comparator 80. The other input 82 of phase comparator 80 is received from a slave/master oscillator 126, which functions similarly, in part, to the master oscillator 26 of the transmission circuit 10. However, for the receiver circuit 58, oscillator 126 functions as a slave oscillator with respect to the output of limiter and tuned circuit 76, and as a master oscillator with respect to slave oscillator 127.

Thus, to provide a means for furnishing two different phase locked reference frequencies to the mixer 70 and amplifier and regenerator 74 of the receiving circuit 58 shown in FIG. 2, the oscillators 126 and 127 are included. Oscillator 126 furnishes a constant frequency source of 12 mHz which is connected through multiplier 150 (with a factor of 2) and divider 152, (with a divisor of 3) to the amplifier and regenerator 74, thereby furnishing clocking pulses for this circuit.

The output 154 of the phase comparator 80, which detects the difference between its two input signals, is fed back to the oscillator 126, for forcing it to oscillate at a frequency which will produce a minimum difference signal between oscillator 126 and the 12 mHz signal derived from the tuned output of circuit 76.

The slave/master oscillator 126 is connected via divider 128, having a divisor of 12, to an input 130 of phase comparator 132; and slave oscillator 127 is connected via divider 36, having a divisor of 11, to an input 138 of the phase comparator 132. Point 142 between the master oscillator 126 and divider 128, is connected to the aforementioned multiplier 150, via point 143. Point 144, between the slave oscillator 127 and divider 136, is connected to the mixer 70. The output 146 of the phase comparator 132 is connected back to the slave oscillator 127, to provide a feedback path for locking the phases of the two referenced frequencies together in the receiving circuit.

Turning now to a further discussion of the characteristics of the operation of the receiver circuit 58, it will be noted that the input signal 60, amplified at amplifier 62, is fed through a symmetrical limiter 64, and then through demodulator 66 and bandpass filter 68, to translate the signal upwardly in frequency level to a bandwidth of 7–11 mHz (frequency spectrum 18*s* in FIG. 4) This signal is then translated downwardly and restored to a 0–4 mHz duobinary signal (waveform 16*w* of FIG. 3, and frequency spectrum 16*s* of FIG. 4), by mixing it with an 11 mixing signal coming from oscillator 127. As shown by the waveform 16w of FIG. 3, the output of mixer 70 represents a sinusoidal duobinary waveform. This signal is then detected at detector 72 and amplified and regenerated at output circuit 74 with a 16 mb/s clocking signal received from divider 152, and referenced to the received carrier signal. The manner in which the 11 mHz mixing signal emanating from oscillator 127 is slaved to the 12 mHz signal emanating from the master oscillator 126, is essentially the same as that previously described for the oscillators 26 and 27.

It should be understood that the waveforms of FIG. 3 and the frequency spectra of FIG. 4 have been idealized, since the distortions produced by various systems arrangements would would not unlikely be different and serve no purpose in furthering an understanding of the present invention. These waveforms and signal spectra are deemed advantageous in teaching the operation and functions inherent in the present invention.

It will now, therefore, be seen that the above transmission and receiving technique for duobinary encoded data provides for the effective communication of this form of information in a very narrow bandwidth. It will be further understood that the teaching of the present invention may be extended to include the long term storage of video and other analog information received by a mixer and bandpass filter and transmitted as a frequency modulated carrier with a carrier present in the transmitted signal for use as a clocking pulse in the receiver circuit.

While in accordance with the Patent Statutes, I have described what at present are considered to be the preferred aspects of this invention, it will be obvious to those skilled in the art that various changes or modifications may be made therein without departing from the present invention.

What I claim is:

1. A method for transmitting clocked duobinary encoded information by frequency modulation of a carrier wave, said method comprising:

frequency translating and filtering a first frequency spectrum containing said clocked duobinary encoded information, to provide a second frequency spectrum separated from said first frequency spectrum;

frequency modulating the carrier wave with said second frequency spectrum;

the frequency of said carrier wave being spectrally near to the upper frequency limit of said second frequency spectrum and frequency modulated so that the modulation index is always less than 0.4 and only a single pair of sidebands are produced by each modulating frequency component;

frequency translating and filtering the frequency modulated carrier wave so that it has a bandwidth approximating the bandwidth of said first frequency spectrum, said frequency translated and filtered frequency modulated carrier wave containing a constant carrier wave component and lower frequency sidebands, with the carrier component providing a continuously present clocking signal; and transmitting said frequency translated and filtered FM carrier wave to an output channel.

2. The method for transmitting clocked information set forth in claim 1, wherein the information represented by the first frequency spectrum is video information.

3. The method for transmitting clocked information set forth in claim 1, wherein the second frequency spectrum is at a higher frequency level than the first frequency spectrum, being separated therefrom by at least 3 mHz; and the carrier wave has a frequency higher than the upper frequency limit of the second frequency spectrum.

4. A method for communicating clocked information by modulation and demodulation of a carrier wave, said method comprising:

at the transmitter:

frequency translating and filtering a first frequency spectrum containing said clocked information, to provide a second frequency spectrum separated from said first frequency spectrum;

frequency modulating the carrier wave with said second frequency spectrum;

the frequency of said carrier wave being spectrally near to the upper frequency limit of said second frequency spectrum and frequency modulated so that the modulation index is always less than 0.4 and only a single pair of sidebands is produced by each modulating frequency component, together with a carrier;

frequency translating and filtering the frequency modulated carrier wave so that it has a bandwidth, approximating the bandwidth of said first frequency spectrum;

said frequency translated and filtered frequency modulated carrier wave containing a constant carrier wave component and lower frequency sidebands, with the carrier component providing a continuously present clocking signal;

transmitting said frequency translated and filtered FM carrier wave to an output channel; and at the receiver:

amplifying said frequency translated FM carrier wave received from said transmission channel;

symmetrically limiting the FM carrier wave;

demodulating and bandpass filtering the symmetrically limited FM carrier wave to obtain a signal at the receiver representative of the second frequency spectrum of the transmitter; and frequency translating the demodulated second frequency spectrum to obtain said first frequency spectrum.

5. A system for transmitting clocked duobinary coded information by frequency modulation, said system comprising:

a binary data input;

an AND gate for receiving said binary data input;

means for providing a stream of clocking pulses to said AND gate;

a flip flop having its input connected to the output of said AND gate, and providing a predetermined first signal spectrum at its output;

a low bandpass filter coupled to the output of said flip flop to provide a predetermined second signal spectrum approximately one half of and in the lower range of said first signal spectrum;

the output of said low bandpass filter being representative of said duobinary coded information;

a mixer having a first input thereof connected to the output of said low bandpass filter and a second input connected to a first predetermined transmission reference frequency;

said first predetermined frequency applied to said mixer being of such a magnitude that the second signal spectrum at the input of said mixer is translated to a higher frequency level;

means for filtering the higher frequency level signal of the mixer to provide a predetermined third signal spectrum separated from and higher than said second signal spectrum;

a frequency modulator having one of its inputs connected to the output of said last mentioned filtering means and the other of its inputs connected to a carrier wave of second predetermined transmission reference frequency;

said second frequency of said carrier being near to the upper frequency limit of said third signal spectrum so that the third signal spectrum frequency modulates said carrier wave, with a modulation index of less than 0.4;

a divider having its input connected to the output of said frequency modulator, for triggering on predetermined edges of the frequency modulated carrier signal; and a vestigial sideband filter having its input connected to said divider for providing only lower sideband at its output;

said output signal also including a persistent carrier component of one half said second predetermined frequency, which provides clocking signals.

6. The system of claim 5 wherein the gate is an OR gate.

7. In combination with the system for transmitting clocked duobinary coded information as set forth in claim 6, a system for receiving the recordable transmitted output signal representing said information, the receiving system comprising:

an amplifier for increasing the magnitude of said transmitted output signal;

an asymmetrical limiter and a tuned circuit connected to the output of said amplifier to obtain a first receiver reference signal representing the second predetermined transmission reference frequency in the transmitted signal;

a symmetrical limiter connected to the output of said amplifier for removing amplitude variations from the frequency modulated signal;

a demodulator and a bandpass filter connected respectively in series with the output of the symmetrical limiter for frequency translating the signal into a waveform representing the third frequency spectrum of the transmitter, a mixer having a first input thereof connected to the output of the last-mentioned bandpass filter and a second input connected to a second receiver reference frequency, to translate the signal downwardly in frequency range into the second frequency spectrum, which represents the transmitted duobinary coded information;

the second receiver reference frequency being referenced to said first receiver reference frequency, thereby to assure that the reference frequency for the receiver mixer is the same as the reference frequency for the transmitter mixer;

and a detector and amplifier regenerator connected respectively to the output of the mixer to reproduce the binary data input of the receiver;

the amplifier/regenerator having a clocking pulse fed thereto from a third receiver reference frequency referenced to said first receiver reference frequency.

8. The system of claim 7 wherein the gate is an OR gate.

* * * * *